United States Patent

[11] 3,555,305

[72] Inventor Heinz Luczkowski
Bielefeld, Germany

[21] Appl. No. 624,899
[22] Filed Mar. 21, 1967
[45] Patented Jan. 12, 1971
[73] Assignee Anker-Werke Aktiengesellschaft
Bielefeld, Germany
a corporation of Germany
[32] Priority Mar. 24, 1966
[33] Germany
[31] No. A 51,946

[54] PULSE GENERATING CIRCUIT ARRANGMENT FOR PRODUCING PULSES OF DIFFERENT ADJUSTABLE DURATIONS
10 Claims, 5 Drawing Figs.

[52] U.S. Cl. .......... 307/265, 307/228, 307/235, 328/58, 328/112, 328/116, 328/180
[51] Int. Cl. .......... H03k 1/18
[50] Field of Search .......... 307/228, 235, 244, 265; 328/36, 58, 62, 111—112, 105—106, 150, 153, 180, 115, 116; 315/26

[56] References Cited
UNITED STATES PATENTS

| | | | |
|---|---|---|---|
| 2,954,502 | 9/1960 | Carpenter et al. .......... | 307/228X |
| 3,257,567 | 6/1966 | Kotas .......... | 328/183X |
| 3,300,655 | 1/1967 | Rosenbluth .......... | 328/183X |
| 3,395,293 | 7/1968 | Perloff .......... | 328/183X |

*Primary Examiner*—Stanley D. Miller
*Attorneys*—Curt M. Avery, Arthur E. Wilfond, Herbert L. Lerner and Daniel J. Tick

ABSTRACT: A pulse generating circuit arrangement comprises a sawtooth generator. The sawtooth generator comprises an adjustable potentiometer connected in series with a capacitor. The input of a potentiometer comprising an adjustable potentiometer connected in series with a voltage divider is connected to the output of the sawtooth generator. The inputs of a threshold switch circuit are connected to the outputs of the potentiometer. The threshold switch circuit comprises a plurality of transistors having emitter electrodes connected to a zero voltage line, base electrodes connected to the outputs of the potentiometer and collector electrodes connected to the corresponding ones of a plurality of outputs and to a source of operating voltage via corresponding ones of a plurality of resistors. The sawtooth generator and potentiometer control the threshold switch circuit to produce at the outputs of said circuit a plurality of output circuits having coincident leading edges and different durations. The adjustable potentiometer of the sawtooth generator controls the duration of the output pulse having a maximum duration provided at one of the outputs of the threshold switch circuit. The adjustable potentiometer of the potentiometer controls the duration of the output pulse having a minimum duration provided at another of the outputs of the threshold switch circuit and the voltage divider of the potentiometer controls the durations of the output pulses having intermediate durations provided at others of the outputs of the threshold switch circuit.

PULSE GENERATING CIRCUIT ARRANGMENT FOR PRODUCING PULSES OF DIFFERENT ADJUSTABLE DURATIONS

DESCRIPTION OF THE INVENTION

The present invention relates to a pulse generating circuit arrangement. More particularly, the invention relates to a pulse generating circuit arrangement for producing pulses of different adjustable durations.

German Pat. No. 1,037,508 discloses an arrangement for producing two output pulses by means of an input pulse, whereby the second output pulse is delayed relative to the first output pulse. The arrangement comprises a transformer having a primary winding connected to the pulse generator and a secondary winding in which the leading edge of the primary pulse produces a first pulse and the trailing edge of said primary pulse produces a time-delayed second pulse, of opposite polarity. Two load circuits are connected in series with the secondary winding of the transformer and an electron tube is connected in parallel with such load circuits. The electron tube responds to the polarity of the pulses in the secondary winding. In accordance with the polarity of the pulses in the circuit of the secondary winding the electron tube short-circuits the load circuit in a manner whereby a first pulse may be derived from one load circuit and a second pulse, which is time-delayed relative to the first pulse, may be derived from the other load circuit. This arrangement is not suitable for the production of more than two time-delayed output pulses.

German Pat. No. 1,038,111 utilizes an oscillator to produce pulse sequences with adjustable pulse durations and pulse spacing. The oscillator produces pulses for a counter which controls by discharge pulses a bistable multivibrator or flip-flop. The flip-flop circuit produces a defined sequence of pulses as well as an adjustable width and a determinable time interval. The pulse sequence simultaneously serves to control an oscillator via another counter and a pulse circuit which determines the time interval of the produced pulses. This circuit arrangement cannot, however, produce pulses having the same leading edge and duration which may be staggered, relative to the time.

Monostable multivibrators, connected in parallel or in series, have been developed as pulse delay circuits. The pulse delay circuits produce output pulses of the aforementioned type in accordance with an input pulse. The disadvantage of the monostable multivibrator circuit is that the time for each monostable multivibrator stage must be adjusted individually. In the case of parallel connected monostable multivibrator stages which provide pulses of approximately equal duration, variations in pulse duration due to temperature variations caused by the spatial arrangement of the circuit, and due to variations in the transistors, may disrupt the sequence of the pulses.

Although the sequence of pulses is not disrupted in monostable multivibrator stages which are connected in series, the monostable multivibrator stages must be logically connected to each other and the produced output pulses are interrupted for short periods at the switching points.

The principal object of the present invention is to provide a new and improved pulse generating circuit arrangement. An object of the present invention is to provide a pulse generating circuit arrangement which overcomes the disadvantages of the pulse generating circuit arrangements of known type, and specifically those which produce output pulses having the same leading edge and different durations. The pulse generating circuit of the present invention is of simple structure, is readily and facilely adjustable, is effective, efficient and reliable in operation and produces pulses having coincident leading edges and different durations.

In accordance with the present invention, a pulse generating circuit arrangement comprises a sawtooth generator having an input and an output. An input applies an input pulse to the input of the sawtooth generator for controlling the operation thereof. A potential shifter, hereinafter briefly called potentiometer, has an input connected to the output of the sawtooth generator and outputs. A threshold switch circuit has inputs connected to the of of the potentiometer and outputs. The threshold switch circuit produces at the outputs under the control of the sawtooth generator and the potentiometer a plurality of output pulses having coincident leading edges and different durations. The sawtooth generator comprises adjustable constant current means and a capacitor connected in series with the constant current means. The output of the sawtooth generator and the input of the potentiometer are connected to the capacitor. The adjustable constant current means comprises an adjustable potentiometer for controlling the duration of the output pulse having a maximum duration provided at one of the outputs pulse having a maximum duration provided at one of the outputs of the threshold switch circuit. The potentiometer comprises an adjustable potentiometer and a voltage divider connected in series with the adjustable potentiometer. The adjustable potentiometer controls the duration of the output pulse having a minimum duration provided at one of the outputs of the threshold switch circuit. The voltage divider of the potentiometer comprises a plurality of resistors having electrical resistances in determined proportions to each other. The voltage divider controls the durations of the output pulses having intermediate durations provided at others of the outputs of the threshold switch circuit. The threshold switch circuit comprises a plurality of transistors each having emitter, collector and base electrodes. The base electrodes of the transistors are connected to the outputs of the potentiometer. The emitter electrodes of the transistors are connected to a zero voltage line and the collector electrodes of the transistors are connected to the corresponding outputs of the threshold switch circuit and to a source of operating voltage via corresponding ones of a plurality of resistors. The threshold switch circuit further comprises a plurality of switching accelerating circuits each connected to a corresponding one of the plurality of transistors.

In order that the present invention may be readily carried into effect, it will now be described with reference to the accompanying drawings, wherein.

Figure 1:
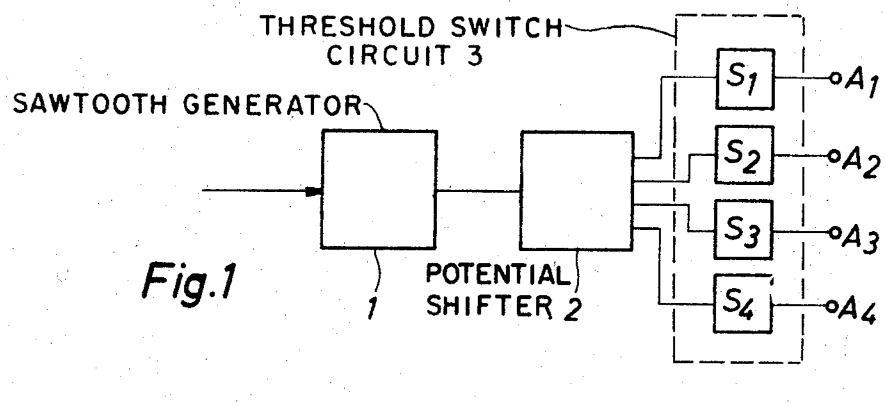
FIG. 1 is a block diagram of an embodiment of the pulse generating circuit arrangement of the present invention.

As shown in FIG. 1, the pulse generating circuit arrangement of the present invention comprises a sawtooth generator 1, a potentiometer 2 and a threshold switch circuit 3. The threshold switch circuit 3 comprises a plurality of threshold switches $S_1$, $S_2$, $S_3$ and $S_4$ having corresponding outputs $A_1$, $A_2$, $A_3$ and $A_4$.

Figure 2:
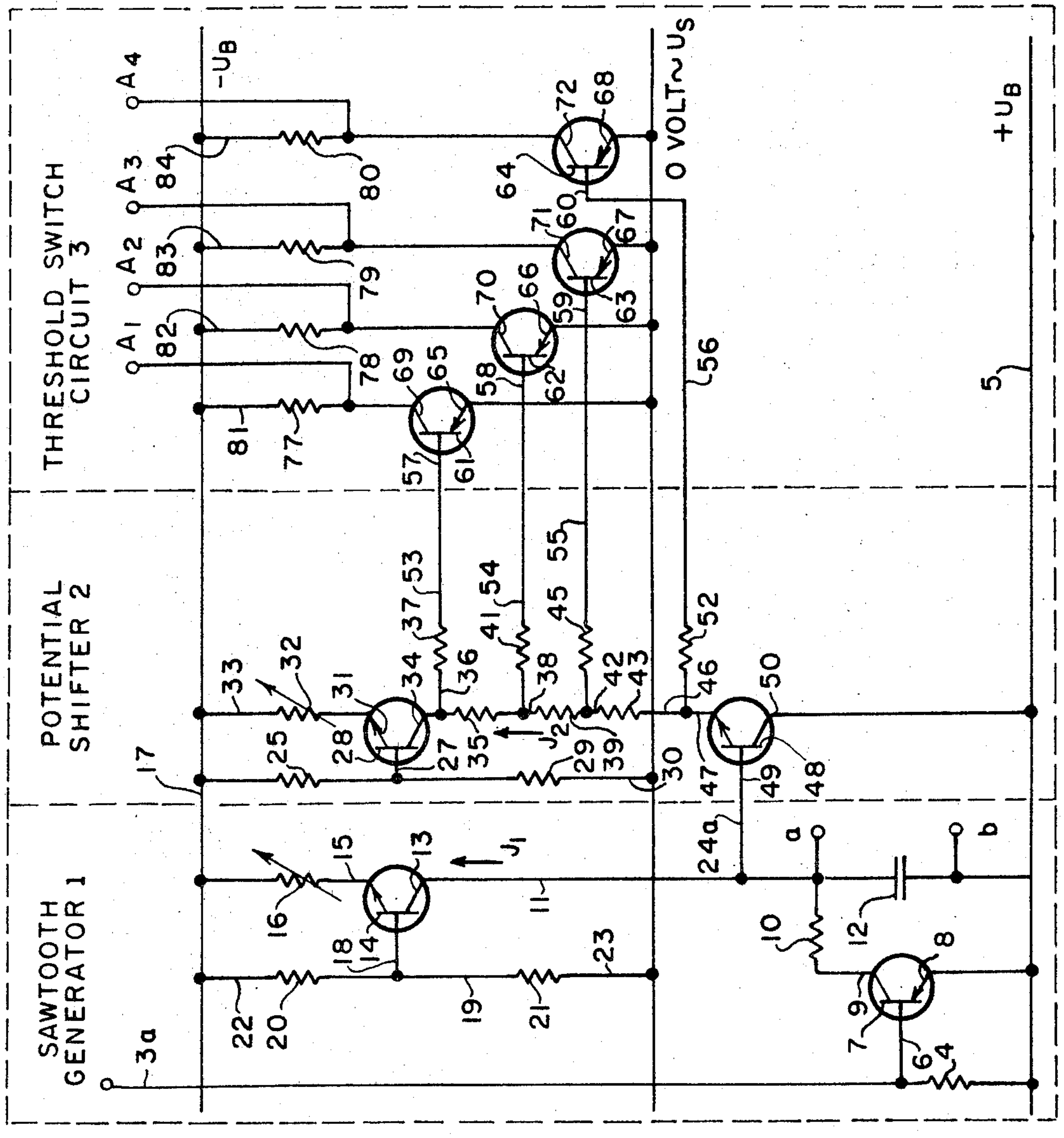
FIG. 2 is a circuit diagram of the embodiment of FIG. 1 of the present invention.

As shown in FIG. 2, the sawtooth generator 1 comprises an input lead 3*a* connected to a pulse generating or timer circuit. The lead 3*a* is connected via a resistor 4 to a lead 5 via which the supply voltage $+U_B$ is applied to the circuit. A lead 6 connects the lead 3*a* to the base electrode of a PNP transistor 7. The emitter electrode 8 of the transistor 7 is connected to the lead 5 and the collector electrode 9 of said transistor is connected to a resistor 10.

The resistor 10 is connected to a capacitor 12 via a lead 11. The capacitor 12 is also connected to the lead 5. A first terminal *a* is connected to one plate of the capacitor 12 and a second terminal *b* is connected to the other plate of said capacitor. The terminals *a* and *b* are utilized to measure the voltage across the capacitor 12. The lead 11 is connected to the collector electrode 13 of a PNP transistor 14. The emitter electrode 15 is connected to a potentiometer 16 which adjusts the current J. The potentiometer 16 is connected to a lead 17 via which the supply voltage $-U_B$ is applied to the circuit. The base electrode 18 of the transistor 14 is connected to a lead 19 in which resistors 20 and 21 are connected. The resistor 20 is connected to the lead 17 via a lead 22 and the resistor 21 is connected to a zero voltage lead 24 having a zero voltage $U_S$ via a lead 23. The output lead 24*a* is connected to the lead 11.

As shown in FIG. 2, the potentiometer 2 comprises a resistor 25 connected to the lead 17. The resistor 25 is connected to the base electrode 27 of an NPN transistor 28 via a lead 26 and to a resistor 29 via said lead. The resistor 29 is connected to the lead 24 via the lead 30. The emitter electrode 31 of the transistor 28 is connected to an adjustable potentiometer 32, which is connected to the lead 17 by a lead 33. The collector electrode 34 of the transistor 28 is connected to a resistor 35 and to a resistor 37 via a lead 36.

The resistor 35 is connected to a resistor 39 via a lead 38 and to a resistor 41 via a lead 40. The resistor 39 is connected to a resistor 43 via a lead 42 and to a resistor 45 via a lead 44. The resistor 43 is connected to the emitter electrode 47 of an NPN transistor 48 via a lead 46. The base electrode 49 of the transistor 48 is connected to the lead 11 via the lead 24*a* which serves as the input of the potentiometer 2 as well as the output of the sawtooth generator 1. The collector electrode 50 of the transistor 48 is connected to the lead 5. The resistor 43 is connected to a resistor 52 via a lead 51. The leads 53, 54, 55 and 56, connected to the resistors 37, 41, 45 and 52, respectively, are the outputs of the potentiometer 2.

The leads 53, 54, 55 and 56 also function as the inputs of the threshold switch circuit 3. The lead 53 connects the resistor 37 to the base electrode 57 of a PNP transistor 61. The lead 54 connects the resistor 41 to the base electrode 58 of a PNP transistor 62. The lead 55 connects the resistor 45 to the base electrode 59 of a PNP transitor 63. The lead 56 connects the resistor 52 to the base electrode 60 of a PNP transistor 64. Each of the emitter electrodes 65, 66, 67 and 68 of the transistors 61, 62, 53 and 64, respectively, is connected to the lead 24. The collector electrode 69 of the transistor 61 is connected to the lead 17 via a lead 73, a resistor 77 and a lead 81. The collector electrode 70 of the transistor 62 is connected to the lead 17 via lead 74, a resistor 78 and a lead 82. The collector electrode 71 of the transistor 63 is connected to the lead 17 via a lead 75, a resistor 79 and a lead 83. The collector electrode 72 of the transistor 64 is connected to the lead 17 via a lead 76, a resistor 80 and a lead 84. The output terminal $A_1$ is connected to the lead 73 via a lead 85. The output terminal $A_2$ is connected to the lead 74 via a lead 86. The output terminal $A_3$ is connected to the lead 75 via a lead 87. The output terminal $A_4$ is connected to the lead 76 via a lead 88.

Figure 3:
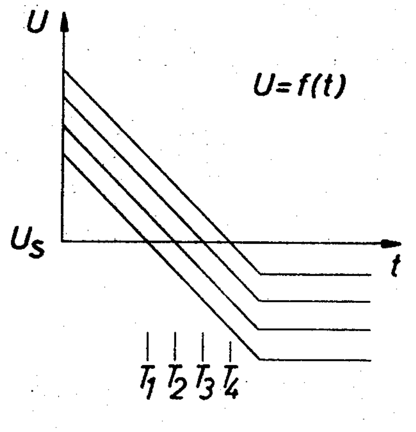
FIG. 3 is a graphical presentation of voltage versus time in the circuit of FIG. 2.

FIG. 3 illustrates the voltage as a function of time. Thus $U=f(t)$, where U is the voltage and t is the time. The resistors 35, 39 and 43 of FIG. 2 are assumed, in this case, to have equal electrical resistances. In FIG. 3, the abscissa represents time t and the ordinate represents voltage U. If the resistances of the resistors 35, 39 and 43 are equal, the intervals between the times $T_1$ and $T_2$, $T_2$ and $T_3$, $T_3$ and $T_4$ are equal.

Figure 4:
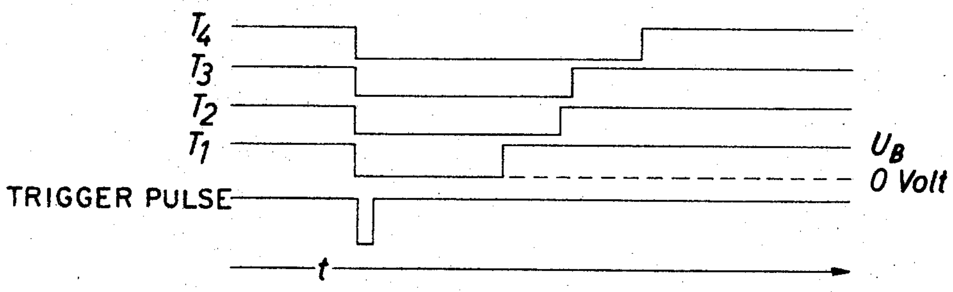
FIG. 4 is a graphical presentation of the output pulses produced by the pulse generating circuit arrangement of the present invention.

FIG. 4 illustrates the output pulses at the output terminals $A_1$, $A_2$ $A_3$ and $A_4$ when the resistances of the resistors 35, 39 and 43 are not equal. Each of the output pulses at $T_1$, $T_2$, $T_3$ and $T_4$ has a leading edge which is coincident with those of the others and with that of the trigger pulse supplied to the input of the sawtooth generator 1 via the lead 3*a* and each of said output pulses has a different duration so that each 3*a* said output pulses has a trailing edge which occurs at a time different from the occurence of the others.

In operation, an input or trigger pulse is supplied to the circuit of FIG. 2 via the input lead 3*a* the input pulse permits the discharge of the capacitor 12 via the transistor 7. Upon the termination of the input pulse, the transistor 7 is again switched to its nonconductive condition. The transistor 14 is connected as an adjustable constant current source which permits the charging of the capacitor 12, so that the voltage of said capacitor rises linearly with time. The resultant sawtooth voltage is applied to the potentiometer 2, and more specifically to the transistor 48. The transistor 48 functions as an emitter follower and its output voltage is applied to a voltage divider comprising the resistors 35, 39 and 43 and the transistor 28. The transistor 28 is connected as a current generator. In this manner, additional sawtooth voltages, displaced by defined potentials, occur at the voltage divider and are applied to the base electrodes 57, 58, 59 and 60, respectively, of the transistors 61, 62, 63 and 64, respectively.

The transistors 61, 62, 63 and 64 function as threshold switches. When the potential at the base electrode of a transistor 61 to 64 reaches the threshold voltage $U_s$, such transistor is switched to its conductive condition. When a transistor 61 to 64 is in its conductive condition, it changes the potential at its corresponding output terminal $A_1$, $A_2$, $A_3$ or $A_4$ from $-U_B$ to zero volts. The threshold voltages $U_s$ are determined by the voltage of the sawtooth generator 1 and the potential differences of the voltage divider. Since this is a linear time function, the constant displacement of the potential of the voltage divider is also a defined time displacement. The ratio of the electrical resistances of the resistors 35, 39 and 43 of the voltage divider is in proportion to the displacement of potential, and is thus also in proportion to the time-staggered output pulses provided at the output terminals $A_1$ to $A_4$.

The pulse duration $T_4$ ($T_n$) of the output pulse of the maximum duration provided at the output terminal $A_4$ ($A_n$) is varied, controlled or adjusted by variation of the potentiometer 16. The pulse duration $T_1$ of the output pulse of minimum duration provided at the output terminal $A_1$ is varied, controlled or adjusted by the potentiometer 32. The pulse durations $T_2$ and $T_3$ of the output pulses of intermediate duration provided at the output terminals $A_2$ and $A_3$ are varied, controlled or adjusted in accordance with the resistance ratio of the resistors 35, 39 and 43.

The duration $T_4$ is determined with adequate exactness by neglecting the collector-saturation voltage of the transistor 7 as well as the base-emitter voltages of the transistors 48 and 64. The transistor 64 is switched to its conductive condition when the voltage at the capacitor 12 becomes negative relative $-$ the threshold voltage $U_s$. The required loading Q of the capacitor 12 results from the general relation:

$$Q=C^{U}=it.$$

In the foregoing relation, if C is the capacitance in microfarads, U is the voltage in volts and *i* is the current in milliamperes, *t* is the time in milliseconds. If $i=J_1=$ a constant and $t=T_4$, the pulse duration $T_4$, in milliseconds is $$T_4=\frac{(+U_B-U_s)C}{J_1}.$$

For all other pulse durations, $$U_c+R\,J_2=U_s,$$

where $U_s$ is the threshold voltage, $U_c$ is the voltage of the capacitor 12 and $J_2$ is the current which is variable under the control of the potentiometer 32.

Although the pulse generating circuit arrangement of FIG. 2 is described as having four outputs, it may have any suitable number *n* of outputs. The pulse generating circuit arrangement of the present invention readily replaces the monostable multivibrators of the prior art. A primary advantage of the pulse generating circuit arrangement of the present invention over the prior art circuits is that the adjustment of the duration of the longest and short pulses automatically adjust the intermediate pulses to a predetermined level. The pulse generating circuit arrangement of the present invention may be utilized to control sequential processes such as, for example, machine control processes and the like.

Figure 5:
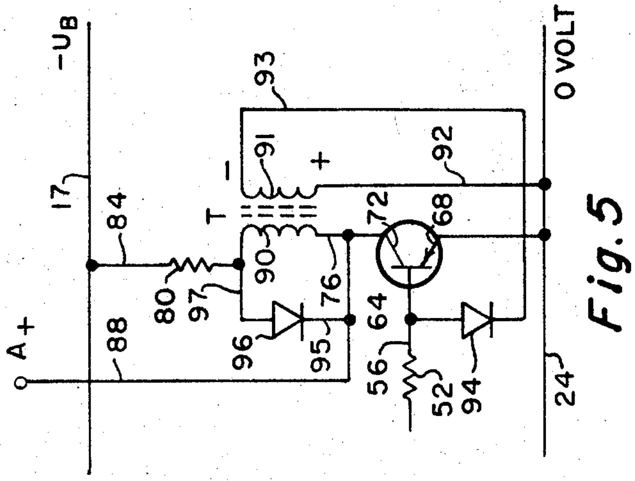
FIG. 5 is a circuit diagram of a modified part of the circuit of FIG. 2.

The switching of the transistors 61 to 64 (FIG. 2) may be considerably accelerated by the accelerating circuit of FIG. 5 in order to provide a steep rise or slope in the sawtooth voltage. The accelerating circuit of FIG. 5 is shown only for one of the transistors 64; actually each transistor should be connected to a corresponding accelerating circuit.

In FIG. 5, the primary winding to of a transformer T is connected in a lead 76 between the collector electrode in of the transistor 64 and the resistor 80. One end of the secondary winding 91 of the 5 is shown only for one of the transistors 64; actually each transistor should be connected to a corresponding accelerating circuit. between the base electrode 60 of the transistor 64 and the resistor 52. The other end of the primary winding 90 is connected to the lead 24 via a lead 92. A diode 96 is connected to the lead 88 via a lead 95 and is connected to the lead 76 via a lead 97. The diode 96 is connected to a point on the lead 76 between the primary winding 90 and the resistor 80.

When the sawtooth voltage switches the transistor 64 to its conductive condition, an output voltage is provided at the secondary winding 91 of the transformer T. Since the negative pole of the secondary winding 91 is connected to the base electrode 60 of the transistor 64, via the lead 93, the diode 94 and the lead 56, the voltage applied to said base electrode accelerates the switching of the transistor 64 to its conductive condition.

While the invention has been described by means of a specific example and in a specific embodiment, I do not wish to be limited thereto, for obvious modifications will occur to those skilled in the art without departing from the spirit and scope of the invention.

I claim:

1. A pulse generating circuit arrangement comprising:
sawtooth generating means having an input and an output;
input means for applying an input pulse to the input of said sawtooth generating means for controlling the operation thereof;
potentiometer means having an input connected to the output of said sawtooth generating means and outputs; and
threshold switching means having inputs connected to the outputs of said potentiometer means and outputs for producing at said outputs under the control of said sawtooth generating means and said potentiometer means a plurality of output pulses having coincident leading edges and different variable durations of the maximum and minimum output pulses, said sawtooth generating means controlling the duration of the output pulse having a maximum duration provided at one of the outputs of said threshold switching means.

2. A pulse generating circuit arrangement as claimed in claim 1, wherein said sawtooth generating means comprises adjustable constant current means and a capacitor connected in series circuit arrangement with said constant current means, the output of said sawtooth generating means being connected to a common point in the connection between said constant current means and said capacitor.

3. A pulse generating circuit arrangement as claimed in claim 1, wherein said potentiometer means comprises an adjustable potentiometer and voltage divider means connected in series with said adjustable potentiometer, said adjustable potentiometer controlling the duration of the output pulse having a minimum duration provided at one of the outputs of said threshold switching means.

4. A pulse generating circuit arrangement comprising:
sawtooth generating means having an input and an output, said sawtooth generating means comprising a first adjustable potentiometer for controlling the duration of the output pulse;
input means for applying an input pulse to the input of said sawtooth generating means for controlling the operation thereof;
potentiometer means having an input connected to the output of said sawtooth generating means and outputs, wherein said potentiometer means comprises a second adjustable potentiometer and voltage divider means connected in series with said second adjustable potentiometer, said second adjustable potentiometer controlling the duration of the output pulse having a minimum duration provided at another of the outputs of said threshold switching means; and
threshold switching means having inputs connected to the outputs of said potentiometer means and outputs for producing at said outputs under the control of said sawtooth generating means and said potentiometer means a plurality of output pulses having coincident leading edges and different durations, the output pulse having a maximum duration provided at one of the outputs of said threshold switching means.

5. A pulse generating circuit arrangement as claimed in claim 4, wherein the voltage divider means of said potentiometer means comprises a plurality of resistors having electrical resistances in determined proportions to each other, said voltage divider means controlling the durations of the output pulses having intermediate durations provided at others of the outputs of said threshold switching means.

6. A pulse generating circuit arrangement as claimed in claim 4, wherein said threshold switching means comprises a plurality of transistors each having emitter, collector and base electrodes, connecting means connecting the base electrodes of said transistors to the voltage divider means of said potentiometer means, a zero voltage line, additional connecting means connecting the emitter electrodes of said transistors to said zero voltage line, a source of operating voltage, a plurality of resistors and further connecting means connecting the collector electrodes of said transistors to the corresponding outputs of said threshold switching means and to said source of operating voltage via corresponding ones of said plurality of resistors.

7. A pulse generating circuit arrangement as claimed in claim 6, wherein said threshold switching means further comprises a plurality of switching accelerating circuits each connected to a corresponding one of said plurality of transistors.

8. A pulse generating circuit arrangement comprising:
sawtooth generating means having an input and an output;
input means for applying an input pulse to the input of said sawtooth generating means for controlling the operation thereof;
potentiometer means having an input connected to the output of said sawtooth generating means and outputs; and
threshold switching means having inputs connected to the outputs of said potentiometer means and outputs for producing at said outputs under the control of said sawtooth generating means and said potentiometer means a plurality of output pulses having coincident leading edges and different durations, said threshold switching means comprising a plurality of transistors each having emitter, collector and base electrodes, connecting means connecting the base electrodes of said transistors to the outputs of said potentiometer means, a zero voltage line, a source of operating voltage, a plurality of resistors, additional connecting means connecting the emitter electrodes of said transistors to said zero voltage line and further connecting means connecting the collector electrodes of said transistors to the corresponding outputs of said threshold switching means and to said source of operating voltage via corresponding ones of said plurality of resistors.

9. A pulse generating circuit arrangement as claimed in claim 8, wherein said threshold switching means further comprises a plurality of switching accelerating circuits each connected to a corresponding one of said plurality of transistors.

10. A pulse generating circuit arrangement comprising:
sawtooth generating means having an input and an output, said sawtooth generating means comprising adjustable constant current means and a capacitor connected in series circuit arrangement with said constant current means:
input means for applying an input pulse to the input of said sawtooth generating means for controlling the operation thereof;

potentiometer means having an input connected to the output of said sawtooth generating means and outputs;
threshold switching means having inputs connected to the outputs of the said potentiometer means and outputs for producing at said outputs under the control of said sawtooth generating means and said potentiometer means a plurality of output pulses having coincident leading edges and different durations, the adjustable constant current means of said sawtooth generating means comprising an adjustable potentiometer for controlling the duration of the output pulse having a maximum duration provided at one of the outputs of said threshold switching means; and
the output of said sawtooth generating means being connected to a common point in the connection between said constant current means and said capacitor.